United States Patent
Saito

(10) Patent No.: US 9,651,768 B2
(45) Date of Patent: May 16, 2017

(54) EYEPIECE LENS AND IMAGING APPARATUS

(71) Applicant: FUJIFILM Corporation, Tokyo (JP)

(72) Inventor: Hiroki Saito, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 14/642,855

(22) Filed: Mar. 10, 2015

(65) Prior Publication Data

US 2015/0192770 A1 Jul. 9, 2015

Related U.S. Application Data

(63) Continuation of application No. PCT/JP2013/005290, filed on Sep. 6, 2013.

(30) Foreign Application Priority Data

Sep. 12, 2012 (JP) ................. 2012-200136

(51) Int. Cl.
*G02B 25/00* (2006.01)
*G02B 15/14* (2006.01)
*G02B 9/14* (2006.01)
*G02B 3/04* (2006.01)

(52) U.S. Cl.
CPC ............. *G02B 25/001* (2013.01); *G02B 3/04* (2013.01)

(58) Field of Classification Search
CPC .. G02B 25/001; G02B 15/177; G02B 15/173; G02B 7/10; G02B 13/18; G02B 23/243; G02B 13/005; G02B 9/12; G02B 13/00; G02B 9/02

USPC .............. 359/645, 689, 690, 695, 716, 735, 359/784–790, 797
See application file for complete search history.

(56) References Cited

U.S. PATENT DOCUMENTS

| | | | |
|---|---|---|---|
| 5,162,945 A | 11/1992 | Matsuo et al. | |
| 5,488,512 A | 1/1996 | Muchel | |
| 2002/0149860 A1 | 10/2002 | Miyauchi et al. | |
| 2008/0225411 A1* | 9/2008 | Kim | G02B 13/18 359/785 |
| 2010/0104272 A1 | 4/2010 | Ogino et al. | |
| 2012/0127595 A1 | 5/2012 | Matsuo | |

FOREIGN PATENT DOCUMENTS

| | | |
|---|---|---|
| CN | 102411191 | 4/2012 |
| JP | 03-087709 | 4/1991 |
| JP | 06-34892 | 2/1994 |

(Continued)

OTHER PUBLICATIONS

International Search Report PCT/JP2013/005290 dated Dec. 24, 2013.

(Continued)

*Primary Examiner* — Dawayne A Pinkney
(74) *Attorney, Agent, or Firm* — Young & Thompson

(57) ABSTRACT

An eyepiece lens consists of, in order from the observed object M side, a first spherical lens having a positive refractive power, a second spherical lens having a negative refractive power, and a third lens having a positive refractive power with at least the observed object-side surface thereof having an aspheric shape. The eyepiece lens satisfies the condition expression below:

$$0.0095 < A3o/f3 < 0.0500 \quad (1).$$

11 Claims, 3 Drawing Sheets

EXAMPLE 1

(56) References Cited

FOREIGN PATENT DOCUMENTS

| | | |
|---|---|---|
| JP | 06-308423 | 11/1994 |
| JP | 07-056095 | 3/1995 |
| JP | 2002-048985 | 2/2002 |
| JP | 2002-303803 | 10/2002 |
| JP | 2006-106491 | 4/2006 |
| JP | 2007-264179 | 10/2007 |
| JP | 2010-134446 | 6/2010 |

OTHER PUBLICATIONS

Chinese Office Action dated May 3, 2016, with English Translation; Application No. 201380046652.2.
Chinese Office Action for Application No. 201380046652.2 dated Nov. 2, 2017.

* cited by examiner

EXAMPLE 1

EXAMPLE 2

EXAMPLE 3

EXAMPLE 1

EXAMPLE 2

EXAMPLE 3

EYEPIECE LENS AND IMAGING APPARATUS

CROSS-REFERENCE TO RELATED APPLICATIONS

This application is a Continuation of PCT International Application No. PCT/JP2013/005290 filed on Sep. 6, 2013, which claims priority under 35 U.S.C. §119(a) to Japanese Patent Application No. 2012-200136 filed on Sep. 12, 2012. Each of the above applications is hereby expressly incorporated by reference, in its entirety, into the present application.

BACKGROUND OF THE INVENTION

Technical Field

The present invention relates to an eyepiece lens used to observe an image displayed on a display screen, and an imaging apparatus provided with the eyepiece lens.

Background Art

Electronic view finders (EVF) for use with cameras such as digital cameras or digital video cameras for observing an enlarged image of an image displayed on a liquid crystal display screen with a naked eye are conventionally proposed. Such an electronic view finder uses an eyepiece lens for observing an enlarged image of the liquid crystal display screen.

As an eyepiece lens usable with the above-described electronic view finders, those disclosed in Japanese Unexamined Patent Publication Nos. 2006-106491, 2010-134446 and 2007-264179 (hereinafter, Patent Documents 1, 2 and 3, respectively), for example, have been proposed.

DISCLOSURE OF INVENTION

Each of Patent Documents 1 and 2 proposes an eyepiece lens consisting of three lenses, a positive lens, a negative lens, and a positive lens in this order from the observed object side, to achieve a compact eyepiece lens having a wide apparent field of view. The eyepiece lenses proposed in Patent Documents 1 and 2, however, include two or more lenses having an aspheric surface and suffer significant image degradation when the eye is shifted in a direction perpendicular to the optical axis. Further, aspheric lenses have a problem of high tendency of manufacturing errors of the surface shape.

An example of an eyepiece lens that consists of three lenses with a reduced number of aspheric lenses is disclosed in Patent Document 3. However, the eyepiece lens of Patent Document 3 has a problem of increase of the entire length.

In view of the above-described circumstances, the present invention is directed to providing a compact eyepiece lens with minimized image degradation upon perpendicular shifting of the eye and minimized performance changes due to manufacturing errors of the surface shape while achieving successful correction of aberrations, as well as an imaging apparatus provided with the eyepiece lens.

An eyepiece lens of the invention consists of, in order from the observed object side: a first spherical lens having a positive refractive power; a second spherical lens having a negative refractive power; and a third lens having a positive refractive power with at least the observed object-side surface thereof having an aspheric shape, wherein the condition expression below is satisfied:

$$0.0095 < A3o/f3 < 0.0500 \quad (1),$$

where A3o is a maximum value of an absolute value of a difference between an amount of sag of the aspheric surface and an amount of sag of a spherical surface represented by a paraxial radius of curvature of the aspheric surface at each height up to 6 mm from the center of the observed object-side surface of the third lens, and f3 is a focal length of the third lens.

The "spherical lens" as used herein means a lens that does not includes an aspheric surface, and the spherical lens encompasses a plano-spherical lens.

The "amount of sag" as used herein means a distance along the optical axis direction between a point on the lens surface and a plane that passes through the apex of the lens surface and is perpendicular to the optical axis.

It is preferred that, in the eyepiece lens of the invention, the condition expression below be satisfied:

$$1.3 < f1/|f2| < 2.5 \quad (2),$$

where f1 is a focal length of the first spherical lens, and f2 is a focal length of the second spherical lens.

Further, it is preferred that the condition expression below be satisfied:

$$1.3 < f/f3 < 2.0 \quad (3),$$

where f is a focal length of the entire system, and f3 is a focal length of the third lens.

Further, it is preferred that the condition expression below be satisfied:

$$1.8 < f/|f2| < 3.2 \quad (4),$$

where f is a focal length of the entire system, and f2 is a focal length of the second spherical lens.

Further, it is preferred that the condition expression below be satisfied:

$$1.73 < Nd1 \quad (5),$$

where Nd1 is a refractive index with respect to the d-line of the first spherical lens.

Further, it is preferred that the condition expression below be satisfied:

$$0.0100 < A3o/f3 < 0.0200 \quad (1\text{-}1).$$

Further, it is preferred that the condition expression below be satisfied:

$$1.5 < f1/|f2| < 2.3 \quad (2\text{-}1).$$

Further, it is preferred that the condition expression below be satisfied:

$$1.7 < f1/|f2| < 2.1 \quad (2\text{-}2).$$

Further, it is preferred that the condition expression below be satisfied:

$$1.4 < f/f3 < 1.8 \quad (3\text{-}1).$$

Further, it is preferred that the condition expression below be satisfied:

$$2.0 < f/|f2| < 2.8 \quad (4\text{-}1).$$

Further, it is preferred that the condition expression below be satisfied:

$$1.75 < Nd1 \quad (5\text{-}1).$$

The imaging apparatus of the invention comprises the above-described eyepiece lens of the invention.

The eyepiece lens of the invention consists of, in order from the observed object side: a first spherical lens having a positive refractive power; a second spherical lens having a negative refractive power; and a third lens having a positive refractive power with at least the observed object-side surface thereof having an aspheric shape, wherein the condition expression below is satisfied:

$$0.0095 < A3o/f3 < 0.0500 \tag{1}.$$

This configuration allows providing a compact eyepiece lens with minimized image degradation upon perpendicular shifting of the eye and minimized performance changes due to manufacturing errors of the surface shape while achieving successful correction of aberrations.

The imaging apparatus of the invention is provided with the eyepiece lens of the invention. This allows providing a high image-quality view finder, and allows size reduction of the imaging apparatus.

DESCRIPTION OF PREFERRED EMBODIMENTS

Figure 1:
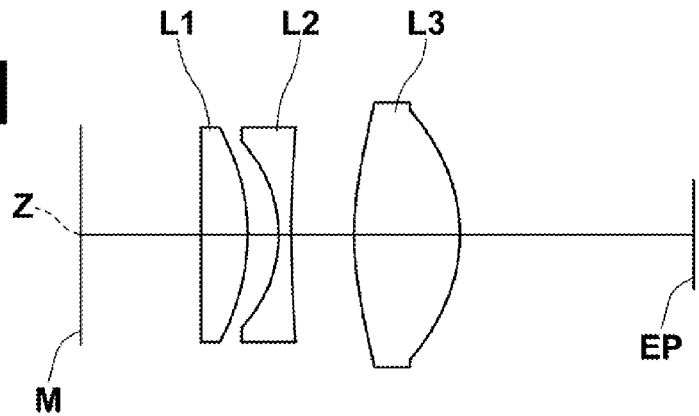
FIG. 1 is a sectional view illustrating the lens configuration of an eyepiece lens according to one embodiment of the invention (an eyepiece lens of Example 1)

Hereinafter, embodiments of the present invention will be described in detail with reference to the drawings. FIG. 1 is a sectional view illustrating the lens configuration of an eyepiece lens according to one embodiment of the invention. The configuration example shown in FIG. 1 corresponds to an eyepiece lens of Example 1, which will be described later. In FIG. 1, the left side is the observed object side, and the right side is the eye point side.

This eyepiece lens consists of, in order from an observed object M side along the optical axis Z, a first spherical lens L1 having a positive refractive power, a second spherical lens L2 having a negative refractive power, and a third lens L3 having a positive refractive power with at least the observed object-side surface thereof having an aspheric shape.

Forming the first lens L1 and the second lens L2 by spherical lenses allows minimizing manufacturing errors of the lenses, and forming the third lens L3 by an aspheric lens allows successful correction of aberrations.

Further, the eyepiece lens satisfies the condition expression (1) below:

$$0.0095 < A3o/f3 < 0.0500 \tag{1},$$

where A3o is a maximum value of an absolute value of a difference between an amount of sag of the aspheric surface and an amount of sag of a spherical surface represented by a paraxial radius of curvature of the aspheric surface at each height up to 6 mm from the center of the observed object-side surface of the third lens, and f3 is a focal length of the third lens.

Assuming that the apparent field of view is 15.8°, the eye point is 15 mm, and the pupil radius of the observer is around 1.75 mm, the area of the third lens L3 through which rays of light travel through is estimated to have a height of about 6 mm (15×tan 15.8°+1.75). The condition expression (1) defines a ratio of the maximum value of the absolute value of the difference between an amount of sag of the aspheric surface and an amount of sag of a spherical surface represented by a paraxial radius of curvature of the aspheric surface at each height up to 6 mm from the center of the observed object-side surface of the third lens L3 relative to a focal length of the third lens L3. If the lower limit of the condition expression (1) is not reached, the aberration correction effect of the third lens L3 is insufficient, and it is difficult to achieve successful correction of aberrations while achieving size reduction. On the other hand, if the upper limit of the condition expression (1) is exceeded, it is difficult to minimize image degradation upon perpendicular shifting of the eye from the optical axis.

When the above-described lens configuration satisfies the condition expression (1), a compact eyepiece lens with minimized image degradation upon perpendicular shifting of the eye can be achieved while achieving successful correction of aberrations. Further, this configuration allows obtaining desired performance even when only one of the three lenses is an aspheric lens (L3), thereby allowing minimizing performance changes due to manufacturing errors of the surface shape and providing an inexpensive eyepiece lens.

It should be noted that higher performance can be obtained when the condition expression (1-1) below is satisfied:

$$0.0100 < A3o/f3 < 0.0200 \tag{1-1}.$$

It is preferred that the eyepiece lens of this embodiment satisfy the condition expression (2) below. The condition expression (2) defines a ratio of the focal length of the first spherical lens L1 to the focal length of the second spherical lens L2. If the lower limit of the condition expression (2) is not reached, the power of the second spherical lens L2 relative to the first spherical lens L1 is insufficient, and it is difficult to achieve correction of longitudinal chromatic aberration. On the other hand, if the upper limit of the condition expression (2) is exceeded, the power of the second lens relative to the first lens is excessive, and it is difficult to achieve correction of aberrations. It should be noted that higher performance can be obtained when the condition expression (2-1) below, or more preferably the condition expression (2-2) below is satisfied.

$$1.3 < f1/|f2| < 2.5 \tag{2},$$

$$1.5 < f1/|f2| < 2.3 \tag{2-1},$$

$$1.7 < f1/|f2| < 2.1 \tag{2-2},$$

where f1 is a focal length of the first spherical lens, and f2 is a focal length of the second spherical lens.

It is preferred that the condition expression (3) below be satisfied. The condition expression (3) defines a ratio of the focal length of the entire system to the focal length of the third lens L3. If the lower limit of the condition expression (3) is not reached, the power of the third lens L3 is insufficient, and it is difficult to ensure a sufficient magnification. On the other hand, if the upper limit of the condition expression (3) is exceeded, the power of the third lens L3 is excessive, and it is difficult to achieve correction of aberrations. It should be noted that higher performance can be obtained when the condition expression (3-1) below is satisfied.

$$1.3 < f/f3 < 2.0 \quad (3),$$

$$1.4 < f/f3 < 1.8 \quad (3\text{-}1),$$

where f is a focal length of the entire system, and f3 is a focal length of the third lens.

It is preferred that the condition expression (4) below be satisfied. The condition expression (4) defines a ratio of the focal length of the entire system to the focal length of the second spherical lens L2. If the lower limit of the condition expression (4) is not reached, the power of the second spherical lens L2 is insufficient, and it is difficult to ensure a sufficient length of eye relief. On the other hand, if the upper limit of the condition expression (4) is exceeded, the power of the second spherical lens L2 is excessive, and it is difficult to achieve correction of aberrations. It should be noted that higher performance can be obtained when the condition expression (4-1) below is satisfied.

$$1.8 < f/|f2| < 3.2 \quad (4),$$

$$2.0 < f/|f2| < 2.8 \quad (4\text{-}1),$$

where f is a focal length of the entire system, and f2 is a focal length of the second spherical lens.

It is preferred that the condition expression (5) below be satisfied. The condition expression (5) defines the refractive index of the first spherical lens L1. If the lower limit of the condition expression (5) is not reached, the Petzval sum increases and it is difficult to achieve correction of field curvature. It should be noted that higher performance can be obtained when the condition expression (5-1) below is satisfied.

$$1.73 < Nd1 \quad (5),$$

$$1.75 < Nd1 \quad (5\text{-}1),$$

where Nd1 is a refractive index with respect to the d-line of the first spherical lens.

As a material of an optical member disposed on the most eye point side of the eyepiece lens, it is preferred to use, specifically, glass, or a transparent ceramic may be used.

In a case where the eyepiece lens is used in a harsh environment, it is preferred that the eyepiece lens be provided with a protective multi-layer coating. Besides the protective coating, the eyepiece lens may be provided with an antireflection coating for reducing ghost light, etc., during use.

Further, various filters, such as a lowpass filter and a filter that cuts off a specific wavelength rang may be disposed in front or back of the eyepiece lens or between the lenses forming the eyepiece lens, or coatings having the same functions as the various filters may be applied to the lens surfaces of some of the lenses forming the eyepiece lens.

Next, numerical examples of the eyepiece lens of the invention are described.

First, an eyepiece lens of Example 1 is described. FIG. 1 is a sectional view illustrating the lens configuration of the eyepiece lens of Example 1. It should be noted that, on FIG. 1 and FIGS. 2 and 3 corresponding to Examples 2 and 3, which will be described later, the left side is the observed object side, and the right side is the eye point side.

In the eyepiece lens of Example 1, the first spherical lens L1 having a positive refractive power is formed by a plano-convex lens, the second spherical lens L2 having a negative refractive power is formed by a biconcave lens, and the third lens L3 having a positive refractive power with at least the observed object-side surface thereof having an aspheric shape is formed by a biconvex lens.

Table 1 shows basic lens data of the eyepiece lens of Example 1, Table 2 shows data about specifications of the eyepiece lens, and Table 3 shows data about aspheric coefficients of the eyepiece lens. In the following description, meanings of symbols used in the tables are explained with respect to Example 1 as an example. The same explanations basically apply to those with respect to Examples 2 and 3.

In the lens data shown in Table 1, each value in the column of "Si" represents the surface number of the i-th (where i=1, 2, 3, . . . ) surface, where the observed object-side surface of the most observed object-side element is the 1st surface and the number is sequentially increased toward the eye point side, each value in the column of "Ri" represents the radius of curvature of the i-th surface, and each value in the column of "Di" represents the distance along the optical axis Z between the i-th surface and the i+1-th surface. Each value in the column of "Ndj" represents the refractive index with respect to the d-line (the wavelength of 587.6 nm) of the j-th (where j=1, 2, 3, . . . ) optical element, where the most observed object-side optical element is the 1st element and the number is sequentially increased toward the eye point side, and each value in the column of "vdj" represents the Abbe number with respect to the d-line (the wavelength of 587.6 nm) of the j-th optical element.

The sign with respect to the radius of curvature is provided such that a positive radius of curvature indicates a surface shape that is convex toward the observed object side, and a negative radius of curvature indicates a surface shape that is convex toward the eye point side. The basic lens data also includes the observed surface and the eye point.

The data about specifications shown in Table 2 shows a value of the focal length f'.

In the basic lens data and the data about specifications, the unit of angle is degrees and the unit of length is millimeters.

In the lens data shown in Table 1, the symbol "*" is added to the surface number of each aspheric shape, and a numerical value of the paraxial radius of curvature is shown as the radius of curvature of each aspheric surface. The data about aspheric coefficients shown in Table 4 show the surface number Si of each aspheric surface and aspheric coefficients about each aspheric surface. The aspheric coefficients are values of the coefficients KA and Am (where m=4, 6, 8 and 10) in the formula (A) of aspheric surface shown below:

$$Zd = C \cdot h^2 / \{1 + (1 - KA \cdot C^2 \cdot h^2)^{1/2}\} + \Sigma Am \cdot h^m \quad (A),$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis), C is a reciprocal of the paraxial radius of curvature, and KA and Am are aspheric coefficients (where m=4, 6, 8 and 10).

TABLE 1

| Example 1 - Lens Data (n and v are with respect to the d-line) | | | | |
|---|---|---|---|---|
| Si (Surface No.) | Ri (Radius of Curvature) | Di (Surface Distance) | Ndj (Refractive Index) | vdj (Abbe Number) |
| (Observed surface) | ∞ | 7.74 | | |
| 1 | ∞ | 3.00 | 1.77250 | 49.60 |
| 2 | −13.9899 | 1.98 | | |

TABLE 1-continued

Example 1 - Lens Data (n and ν are with respect to the d-line)

| Si (Surface No.) | Ri (Radius of Curvature) | Di (Surface Distance) | Ndj (Refractive Index) | νdj (Abbe Number) |
|---|---|---|---|---|
| 3 | −8.7534 | 0.80 | 1.84666 | 23.78 |
| 4 | 81.4797 | 4.06 | | |
| *5 | 19.9485 | 6.78 | 1.53389 | 55.98 |
| *6 | −10.8535 | 15.00 | | |
| (Eye point) | ∞ | | | |

TABLE 2

Example 1 - Specifications (d-line)

| f | 23.09 |
|---|---|

TABLE 3

Example 1 - Aspheric Coefficients

| | Surface No. | |
|---|---|---|
| | 5 | 6 |
| KA | −1.7111462E−02 | 4.0302656E−01 |
| A4 | −1.5824332E−04 | −2.2147333E−05 |
| A6 | 1.5951346E−06 | 3.6684005E−07 |
| A8 | −1.4804307E−08 | −3.8188898E−09 |
| A10 | 5.8688939E−11 | 7.6539842E−12 |

Figure 4:
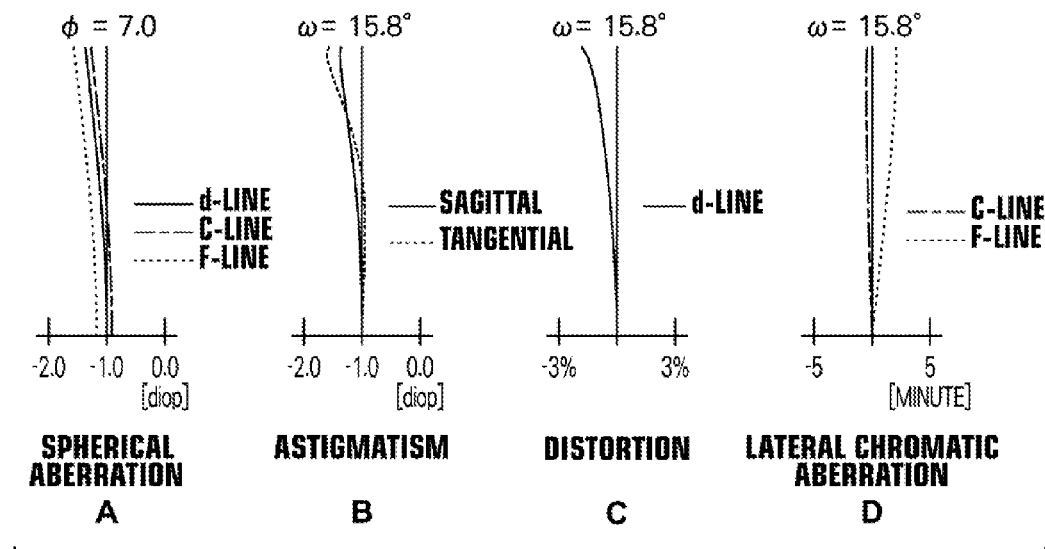
FIG. 4 shows, at A to D, diagrams showing aberrations of the eyepiece lens of Example 1 of the invention.

FIG. 4 shows, at A to D diagrams showing aberrations of the eyepiece lens of Example 1. The diagrams shown at A to D in FIG. 4 show spherical aberration, astigmatism, distortion, and lateral chromatic aberration, respectively.

The aberration diagrams of spherical aberration, astigmatism, and distortion show those with respect to the d-line (the wavelength of 587.6 nm), which is used as a reference wavelength. The aberration diagram of spherical aberration shows spherical aberrations with respect to the d-line (the wavelength of 587.6 nm), the C-line (the wavelength of 656.3 nm), and the F-line (the wavelength of 486.1 nm) in the solid line, the dashed-dotted line, and the dotted line, respectively. The aberration diagram of astigmatism shows astigmatisms in the sagittal direction and the tangential direction in the solid line and the dashed line, respectively. The aberration diagram of lateral chromatic aberration shows lateral chromatic aberrations with respect to the C-line (the wavelength of 656.3 nm) and the F-line (the wavelength of 486.1 nm) in the solid line and the dotted line, respectively. The symbol "φ" in the aberration diagram of spherical aberration means "design pupil diameter", and the symbol "ω" in the other aberration diagrams means "apparent field of view".

Figure 2:
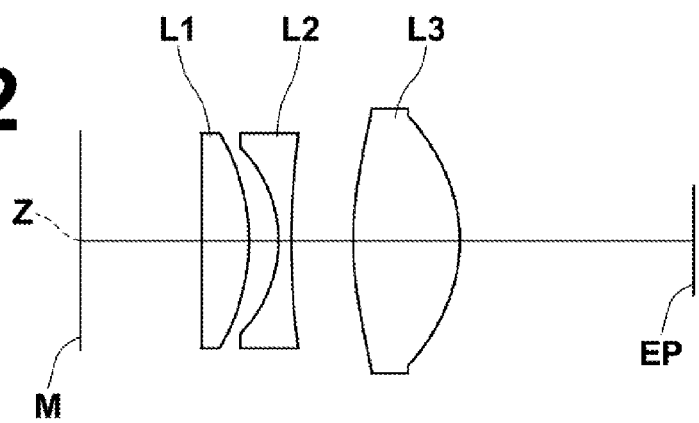
FIG. 2 is a sectional view illustrating the lens configuration of an eyepiece lens of Example 2 of the invention.

Next, an eyepiece lens of Example 2 is described. FIG. 2 is a sectional view illustrating the lens configuration of the eyepiece lens of Example 2.

The configuration of the eyepiece lens of Example 2 is the same as that of the eyepiece lens of Example 1, except that the first spherical lens L1 having a positive refractive power is formed by a positive meniscus lens.

Figure 5:
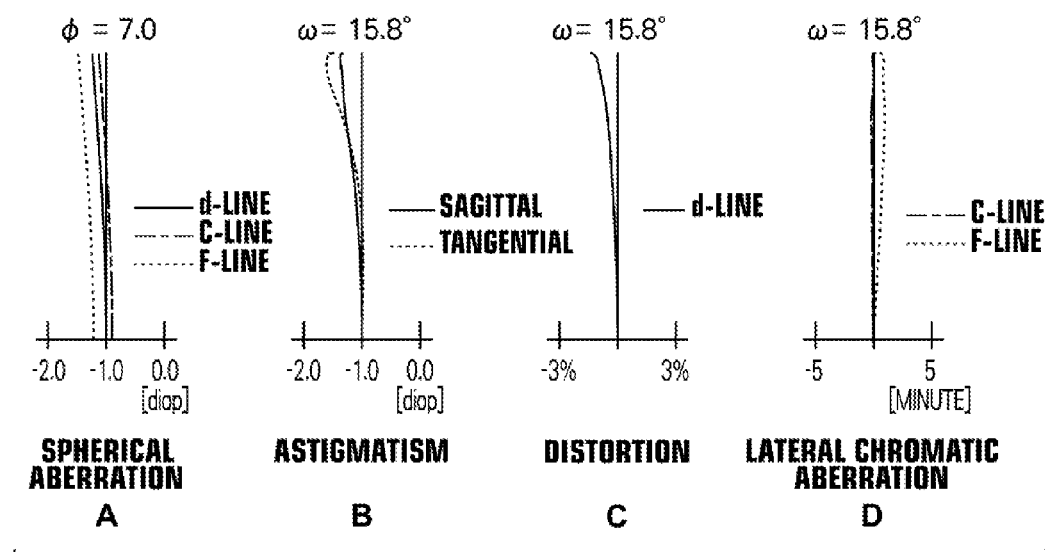
FIG. 5 shows, at A to D, diagrams showing aberrations of the eyepiece lens of Example 2 of the invention.

Table 4 shows basic lens data of the eyepiece lens of Example 2, Table 5 shows data about specifications of the eyepiece lens, Table 6 shows data about aspheric coefficients of the eyepiece lens, and FIG. 5 shows, at A to D, diagrams showing aberrations of the eyepiece lens.

TABLE 4

Example 2 - Lens Data (n and ν are with respect to the d-line)

| Si (Surface No.) | Ri (Radius of Curvature) | Di (Surface Distance) | Ndj (Refractive Index) | νdj (Abbe Number) |
|---|---|---|---|---|
| (Observed surface) | ∞ | 7.78 | | |
| 1 | −2266.8965 | 3.07 | 1.77250 | 49.60 |
| 2 | −13.5265 | 1.89 | | |
| 3 | −8.5466 | 0.80 | 1.80518 | 25.42 |
| 4 | 52.5606 | 4.00 | | |
| *5 | 21.3317 | 6.84 | 1.53389 | 55.98 |
| *6 | −10.5489 | 15.00 | | |
| (Eye point) | ∞ | | | |

TABLE 5

Example 2 - Specifications (d-line)

| f | 23.26 |
|---|---|

TABLE 6

Example 2 - Aspheric Coefficients

| | Surface No. | |
|---|---|---|
| | 5 | 6 |
| KA | 6.0723754E−02 | 3.8036401E−01 |
| A4 | −1.4263074E−04 | −2.0782979E−05 |
| A6 | 1.2818903E−06 | 1.8702194E−07 |
| A8 | −1.1751757E−08 | −2.2718979E−09 |
| A10 | 4.5939842E−11 | −1.8900395E−12 |

Figure 3:
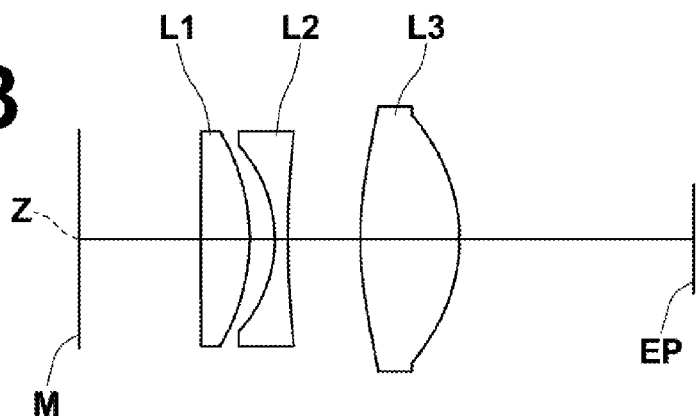
FIG. 3 is a sectional view illustrating the lens configuration of an eyepiece lens of Example 3 of the invention.

Next, an eyepiece lens of Example 3 is described. FIG. 3 is a sectional view illustrating the lens configuration of the eyepiece lens of Example 3.

The configuration of the eyepiece lens of Example 3 is the same as that of the eyepiece lens of Example 1, except that the first spherical lens L1 having a positive refractive power is formed by a biconvex lens.

Figure 6:
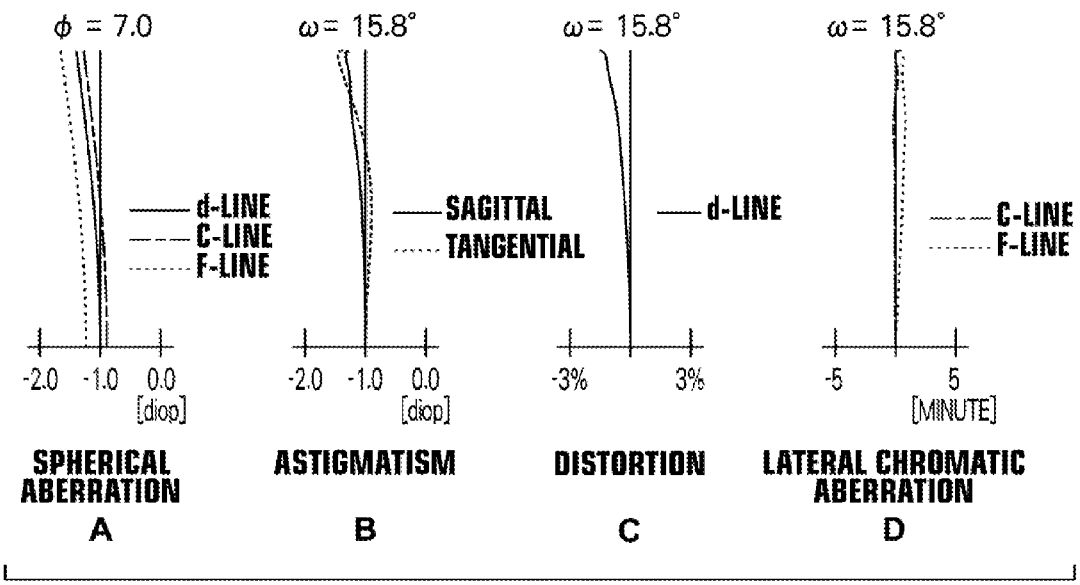
FIG. 6 shows, at A to D, diagrams showing aberrations of the eyepiece lens of Example 3 of the invention.

Table 7 shows basic lens data of the eyepiece lens of Example 3, Table 8 shows data about specifications of the eyepiece lens, Table 9 shows data about aspheric coefficients of the eyepiece lens, and FIG. 6 shows, at A to D, diagrams showing aberrations of the eyepiece lens.

TABLE 7

Example 3 - Lens Data (n and ν are with respect to the d-line)

| Si (Surface No.) | Ri (Radius of Curvature) | Di (Surface Distance) | Ndj (Refractive Index) | νdj (Abbe Number) |
|---|---|---|---|---|
| (Observed surface) | ∞ | 7.83 | | |
| 1 | 1133.1782 | 3.14 | 1.77250 | 49.60 |
| 2 | −13.3614 | 1.63 | | |
| 3 | −8.8302 | 0.80 | 1.80518 | 25.42 |
| 4 | 61.4261 | 4.67 | | |
| *5 | 22.0465 | 6.37 | 1.53389 | 55.98 |
| *6 | −11.3157 | 15.00 | | |
| (Eye point) | ∞ | | | |

TABLE 8

Example 3 - Specifications (d-line)

| f | 23.14 |
|---|---|

TABLE 9

Example 3 - Aspheric Coefficients

| Surface No. | | |
|---|---|---|
| | 5 | 6 |
| KA | 5.9807181E−02 | 3.0262328E−01 |
| A4 | −1.3990252E−04 | −3.6516049E−05 |
| A6 | 9.5955547E−07 | 3.6455682E−08 |
| A8 | −4.1648566E−09 | 8.0077843E−10 |
| A10 | 3.3818594E−12 | −1.2006997E−11 |

Table 10 shows values corresponding to the condition expressions (1) to (4) of the eyepiece lenses of Examples 1 to 3. It should be noted that, in all the examples, the d-line is the reference wavelength and the values shown in Table 10 are with respect to the reference wavelength.

TABLE 10

| No. | Condition Expression | Example 1 | Example 2 | Example 3 |
|---|---|---|---|---|
| (1) | A3o/f3 | 0.0122 | 0.0111 | 0.0105 |
| (2) | f1/|f2| | 1.95 | 1.94 | 1.79 |
| (3) | f/f3 | 1.62 | 1.63 | 1.54 |
| (4) | f/|f2| | 2.48 | 2.56 | 2.43 |

As can be seen from the above-described data, each of the eyepiece lenses of Examples 1 to 3 satisfies the condition expressions (1) to (5), and is a compact eyepiece lens with minimized image degradation upon perpendicular shifting of the eye and minimized performance changes due to manufacturing errors of the surface shape while achieving successful correction of aberrations.

Figure 7:
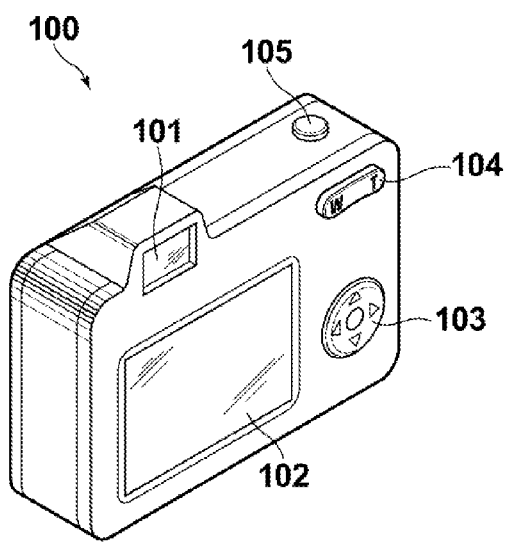
FIG. 7 is a diagram illustrating the schematic configuration of an imaging apparatus according to an embodiment of the invention.

Next, an imaging apparatus according to an embodiment of the invention is described. FIG. 7 is a perspective view, viewed from the rear side, of a digital camera 100 according to one embodiment of the imaging apparatus of the invention.

The digital camera 100 includes an eyepiece lens 101 according to the embodiment of the invention disposed at an upper portion of the camera body. The digital camera 100 also includes, on the rear side of the camera body, a monitor 102 for displaying images and various setting screens, an operation button 103 used to perform various settings, and a zoom lever 104 used to perform magnification change. The digital camera 100 also includes a shutter button 105 disposed on the top side of the camera body.

In the digital camera 100, an image of a subject taken by an imaging lens (not shown) disposed on the front side of the camera body is formed on the imaging surface of an image sensor (not shown), and the image is displayed on a liquid crystal display screen (not shown) of a view finder. The user observes the liquid crystal display screen of the electronic view finder through the eyepiece lens 101 from the rear side.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, etc., of each lens element are not limited to the values shown in the above-described numerical examples and may take different values.

What is claimed is:

1. An eyepiece lens consisting of, in order from an observed object side:
   a first spherical lens having a positive refractive power;
   a second spherical lens having a negative refractive power; and
   a third lens having a positive refractive power with at least an observed object-side surface thereof having an aspheric shape,
   wherein the condition expressions below are satisfied:

$$0.0095 < A3o/f3 < 0.0500 \qquad (1), \text{and}$$

$$1.3 < f1/|f2| < 2.5 \qquad (2),$$

where A3o is a maximum value of an absolute value of a difference between an amount of sag of the aspheric surface and an amount of sag of a spherical surface represented by a paraxial radius of curvature of the aspheric surface at each height up to 6 mm from the center of the observed object-side surface of the third lens, f3 is a focal length of the third lens, f1 is a focal length of the first spherical lens, and f2 is a focal length of the second spherical lens.

2. The eyepiece lens as claimed in claim 1, wherein the condition expression below is satisfied:

$$1.3 < f/f3 < 2.0 \qquad (3),$$

where f is a focal length of the entire system, and f3 is a focal length of the third lens.

3. The eyepiece lens as claimed in claim 1, wherein the condition expression below is satisfied:

$$1.8 < f/|f2| < 3.2 \qquad (4),$$

where f is a focal length of the entire system, and f2 is a focal length of the second spherical lens.

4. The eyepiece lens as claimed in claim 1, wherein the condition expression below is satisfied:

$$1.73 < Nd1 \qquad (5),$$

where Nd1 is a refractive index with respect to the d-line of the first spherical lens.

5. The eyepiece lens as claimed in claim 1, wherein the condition expression below is satisfied:

$$0.0100 < A3o/f3 < 0.0200 \qquad (1\text{-}1),$$

where A3o is a maximum value of an absolute value of a difference between an amount of sag of the aspheric surface and an amount of sag of a spherical surface represented by a paraxial radius of curvature of the aspheric surface at each height up to 6 mm from the center of the observed object-side surface of the third lens, and f3 is a focal length of the third lens.

6. The eyepiece lens as claimed in claim 1, wherein the condition expression below is satisfied:

$$1.5 < f1/|f2| < 2.3 \qquad (2\text{-}1),$$

where f1 is a focal length of the first spherical lens, and f2 is a focal length of the second spherical lens.

7. The eyepiece lens as claimed in claim 1, wherein the condition expression below is satisfied:

$$1.7 < f1/|f2| < 2.1 \qquad (2\text{-}2),$$

where f1 is a focal length of the first spherical lens, and f2 is a focal length of the second spherical lens.

8. The eyepiece lens as claimed in claim 1, wherein the condition expression below is satisfied:

$$1.4 < f/f3 < 1.8 \quad (3\text{-}1),$$

where f is a focal length of the entire system, and f3 is a focal length of the third lens.

9. The eyepiece lens as claimed in claim 1, wherein the condition expression below is satisfied:

$$2.0 < f/|f2| < 2.8 \quad (4\text{-}1),$$

where f is a focal length of the entire system, and f2 is a focal length of the second spherical lens.

10. The eyepiece lens as claimed in claim 1, wherein the condition expression below is satisfied:

$$1.75 < Nd1 \quad (5\text{-}1),$$

where Nd1 is a refractive index with respect to the d-line of the first spherical lens.

11. An imaging apparatus comprising the eyepiece lens as claimed in claim 1.

* * * * *